US011237815B2

(12) United States Patent
Woodmansee et al.

(10) Patent No.: US 11,237,815 B2
(45) Date of Patent: Feb. 1, 2022

(54) SERVICE POOL ARCHITECTURE FOR MULTITENANT SERVICES TO SUPPORT CANARY RELEASE

(71) Applicant: Citrix Systems, Inc., Fort Lauderdale, FL (US)

(72) Inventors: Kevin Woodmansee, Lighthouse Point, FL (US); Leo C. Singleton, IV, Fort Lauderdale, FL (US); Sam Arun Seeniraj, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 116 days.

(21) Appl. No.: 16/110,370

(22) Filed: Aug. 23, 2018

(65) Prior Publication Data

US 2020/0065086 A1 Feb. 27, 2020

(51) Int. Cl.
*G06F 8/65* (2018.01)
*G06F 9/455* (2018.01)
(Continued)

(52) U.S. Cl.
CPC ............ *G06F 8/65* (2013.01); *G06F 9/45558* (2013.01); *G06F 11/3688* (2013.01);
(Continued)

(58) Field of Classification Search
CPC ..... G06F 8/30; G06F 8/47; G06F 8/60; G06F 8/65; G06F 8/658; G06F 8/68; G06F 8/71;
(Continued)

(56) References Cited

U.S. PATENT DOCUMENTS

| 2011/0178831 A1* | 7/2011 | Ravichandran | ........ G06Q 10/06 705/7.11 |
| 2017/0118110 A1* | 4/2017 | Cohen | ........................ G06F 8/65 |

(Continued)

OTHER PUBLICATIONS

Schermann, Gerald, et al., "Bifrost—Supporting Continuous Deployment with Automated Enactment of Multi-Phase Live Testing Strategies," Nov. 28, 2016, pp. 1-14.

(Continued)

*Primary Examiner* — Wei Y Zhen
*Assistant Examiner* — Mohammed N Huda
(74) *Attorney, Agent, or Firm* — Banner & Witcoff, Ltd.

(57) ABSTRACT

Aspects of the disclosure relate to using service pool architecture for multitenant services to support canary release. An enterprise canary release server may create a plurality of service pools for a tenant in a cloud-based system that supports a plurality of tenants, where each service pool may comprise a plurality of microservices. The enterprise canary release server may receive a request to perform a canary release for a new version of software and identify a first microservice out of the plurality of microservices in a first service pool. The enterprise canary release server may instantiate a new microservice in the first service pool and enable data plane connectivity between the new microservice and a second microservice. Accordingly, the enterprise canary release server may disable data plane connectivity between the first microservice and the second microservice.

14 Claims, 13 Drawing Sheets

(51) Int. Cl.
  *H04L 29/08* (2006.01)
  *G06F 11/36* (2006.01)
  *H04L 12/24* (2006.01)
  *G06Q 10/06* (2012.01)
  *H04L 12/717* (2013.01)
  *H04L 12/911* (2013.01)
(52) U.S. Cl.
  CPC ... *G06F 2009/45562* (2013.01); *G06Q 10/06* (2013.01); *H04L 41/0806* (2013.01); *H04L 45/42* (2013.01); *H04L 47/70* (2013.01); *H04L 67/10* (2013.01); *H04L 67/34* (2013.01)
(58) Field of Classification Search
  CPC ............. G06F 9/45533; G06F 9/45558; G06F 9/5055; G06F 11/368; G06F 11/3684; G06F 11/3688; G06F 11/3692; H04L 41/0806; H04L 45/42; H04L 47/70; H04L 67/10; H04L 67/34; H04L 67/42; G06Q 10/06
  USPC ........................................................ 717/171
  See application file for complete search history.

(56) References Cited

U.S. PATENT DOCUMENTS

2017/0242784 A1* 8/2017 Heorhiadi et al. ... G06F 11/3684
2018/0260212 A1* 9/2018 Wisnovsky ............... G06F 8/71

OTHER PUBLICATIONS

Sato, Danilo, "Canary Release," Oct. 24, 2019, 4 pages, https://martinfowler.com/bliki/CanaryRelease.html.
Melendez, Christian, "A Detailed Guide to Canary Deployments," May 21, 2018, DevOps Zone, 11 pages.
Humble, Jez, et al., "Continuous Delivery," Addison Wesley Signature Series, Aug. 1, 2010, 10 pages.
Mar. 30, 2021—(EP) Official Action—App 19762654.2, pp. 1-3.

* cited by examiner

SERVICE POOL ARCHITECTURE FOR MULTITENANT SERVICES TO SUPPORT CANARY RELEASE

FIELD

Aspects of the disclosure relate to computer hardware and software. In particular, one or more aspects of the disclosure generally relate to computer hardware and software for multitenant data management and software deployment in a cloud computing environment.

BACKGROUND

A cloud-based virtual environment may need to serve multiple tenants. A tenant may be a group of enterprise users who share a common access with specific privileges to a software instance. As enterprises in the cloud expand their services, the volume, variety and velocity at which data arrives increase drastically. Large scale cloud services may need to frequently scale out to millions of users with low-risk, and minimal downtime. As a result, conventional systems are not be able to meet these challenges with efficiency, performance, seamlessness and scalability.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a service pool architecture to support canary deployments for multitenant services.

In accordance with one or more aspects of the disclosure, an enterprise canary release server having at least one processor, memory, and a communication interface may create a plurality of service pools for a tenant in a cloud-based system that supports a plurality of tenants, with each service pool comprising a plurality of microservices. Subsequently, the enterprise canary release server may receive, via the communication interface, a request to perform a canary release for a new version of software, and may identify a first microservice out of the plurality of microservices in a first service pool and the first microservice may be configured to communicate with a second microservice in a second service pool. Thereafter, the enterprise canary release server may instantiate a new microservice that hosts the new version of the software in the first service pool, enable data plane connectivity between the new microservice and the second microservice, and disable data plane connectivity between the first microservice and the second microservice.

In some instances, prior to receiving the request for the canary release, the enterprise canary release server may provision each microservice in each service pool to service a dedicated tenant. In some instances, prior to receiving the request for the canary release, the enterprise canary release server may provision each service pool to service the plurality of tenants.

In some instances, in response to disabling data plane connectivity between the first microservice and the second microservice, the enterprise canary release server may decommission the first microservice and reconfigure the first microservice to service a second tenant in the plurality of tenants.

In some instances, the enterprise canary release server may receive, via the communication interface, a request to roll back the new version of software. For example, the enterprise canary release server may disable the data plane connectivity between the new microservice and the second microservice, and enable the data plane connectivity between the first microservice and the second microservice. As such, the enterprise canary release server may decommission the new microservice that hosts the new version of the software in the first service pool.

In some instances, the enterprise canary release server may dynamically assign a first number of microservices from the plurality of microservices in the first service pool and a second number of microservices from the plurality of microservices in the second service pool to service the tenant based on a variation of loads in the first service pool and the second service pool.

In some instances, the enterprise canary release server may create the service pools in such a way that they are associated with a plurality of single-tenant databases. In some instances, the enterprise canary release server may configure the microservices in such a way that the microservices assigned for each tenant are associated with a single-tenant database from the plurality of single-tenant databases.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using service pool architecture for multitenant services to support canary release. A virtual site may comprise a single-tenant database and a collection of assignments of shared service pools. The service pool assignments may allow for both calculating usage and scaling out capacity independently. Rather than lumping the services for a tenant together in a single-tenant architecture, service pools may allow for independent release cycles for specific services, given that more frequent and granular releases may reduce risk. The service pool architecture may further allow canary rollouts at the per service pool per virtual site level. As such, this pinpoint granularity may adventurously enable deployment and canary strategies with even further reduced risk and impact.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
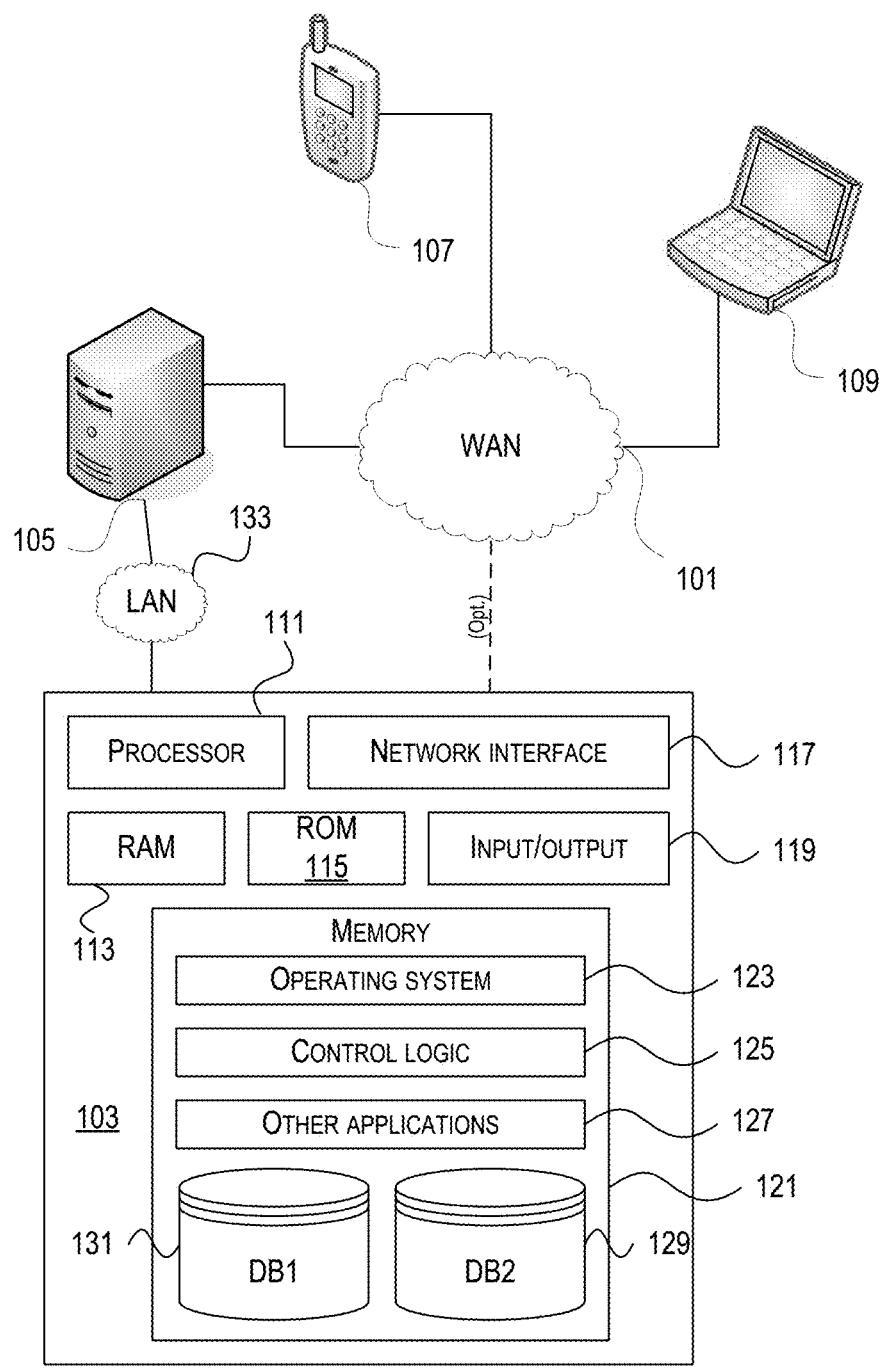
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
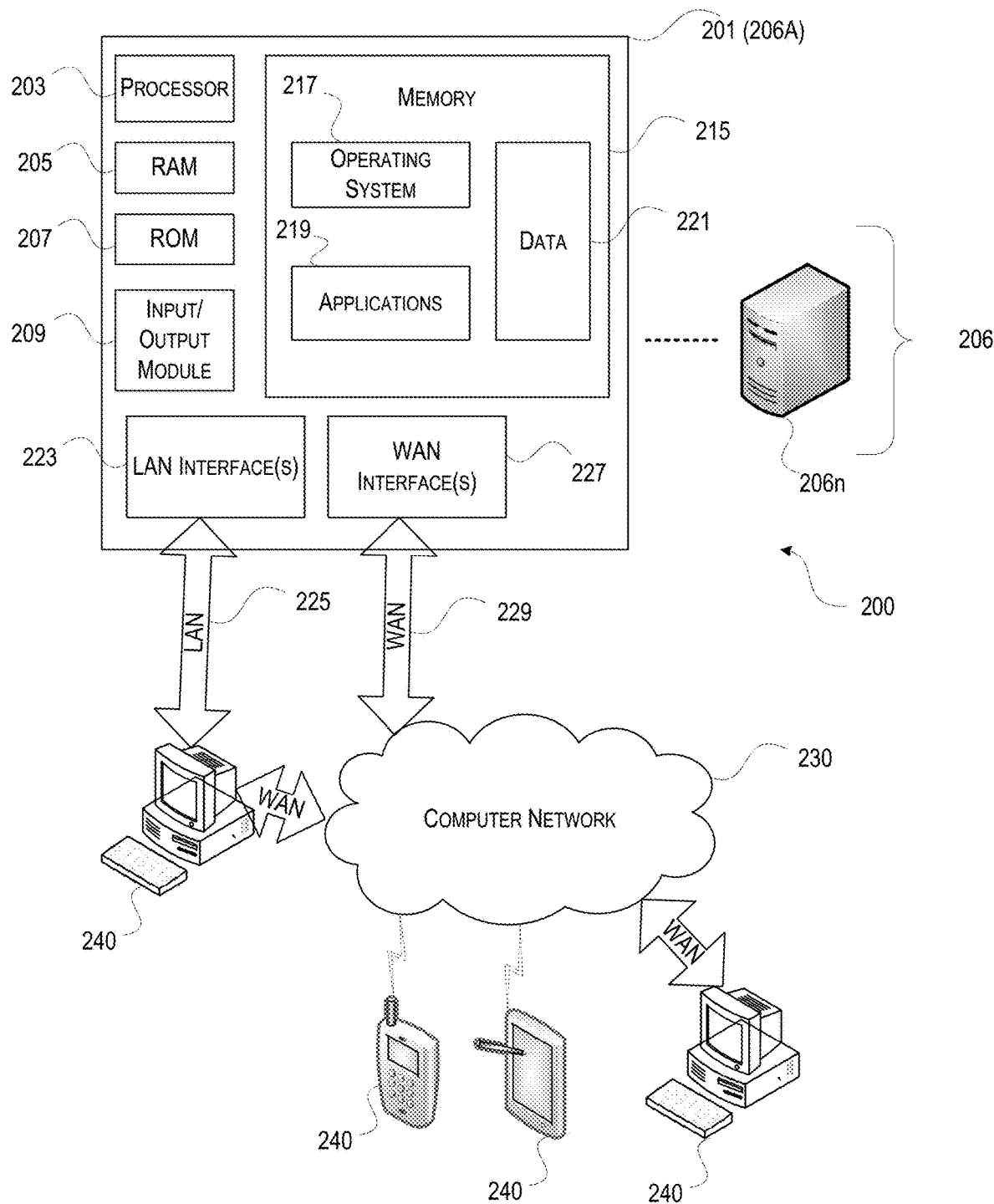
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
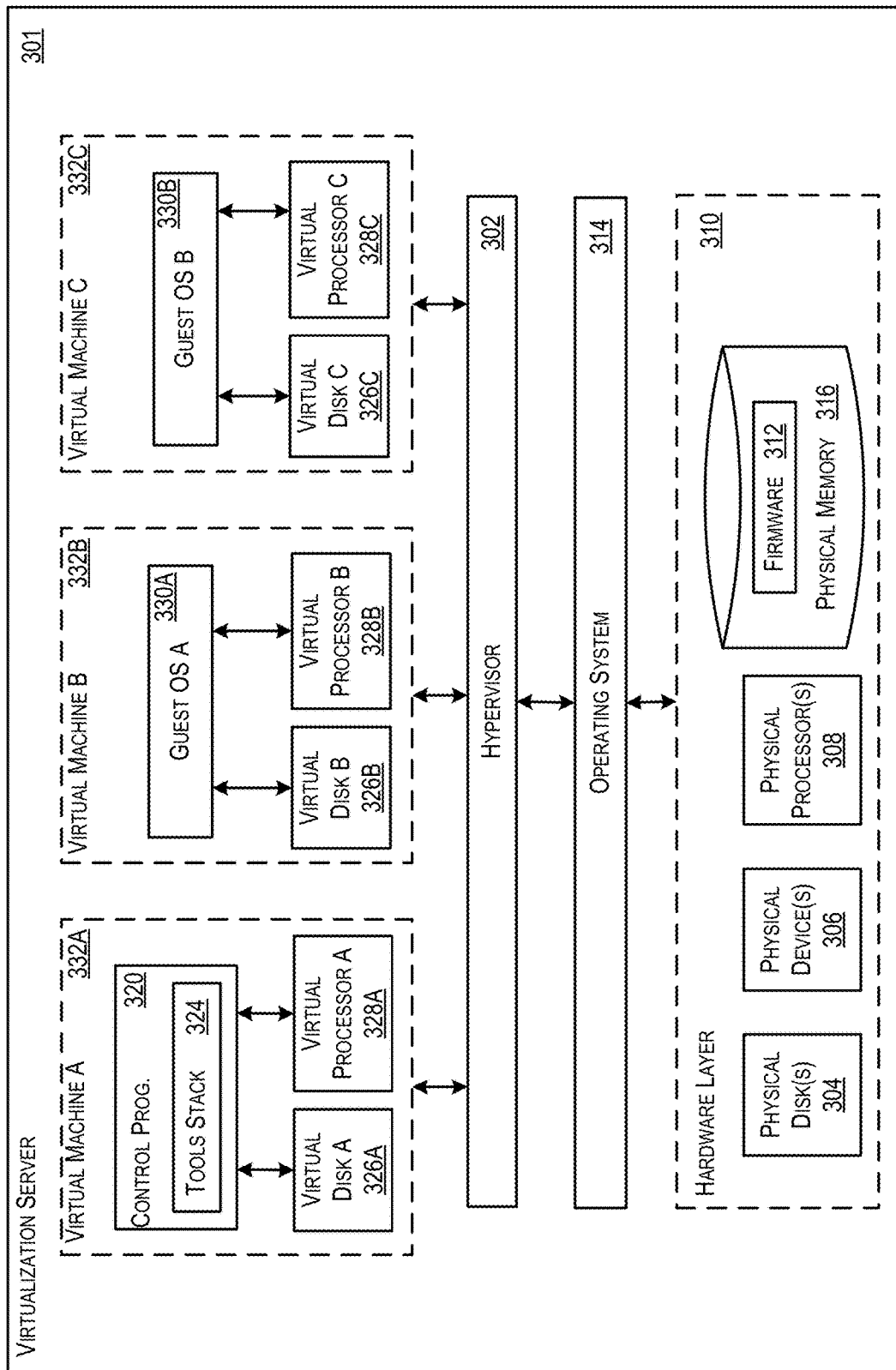
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
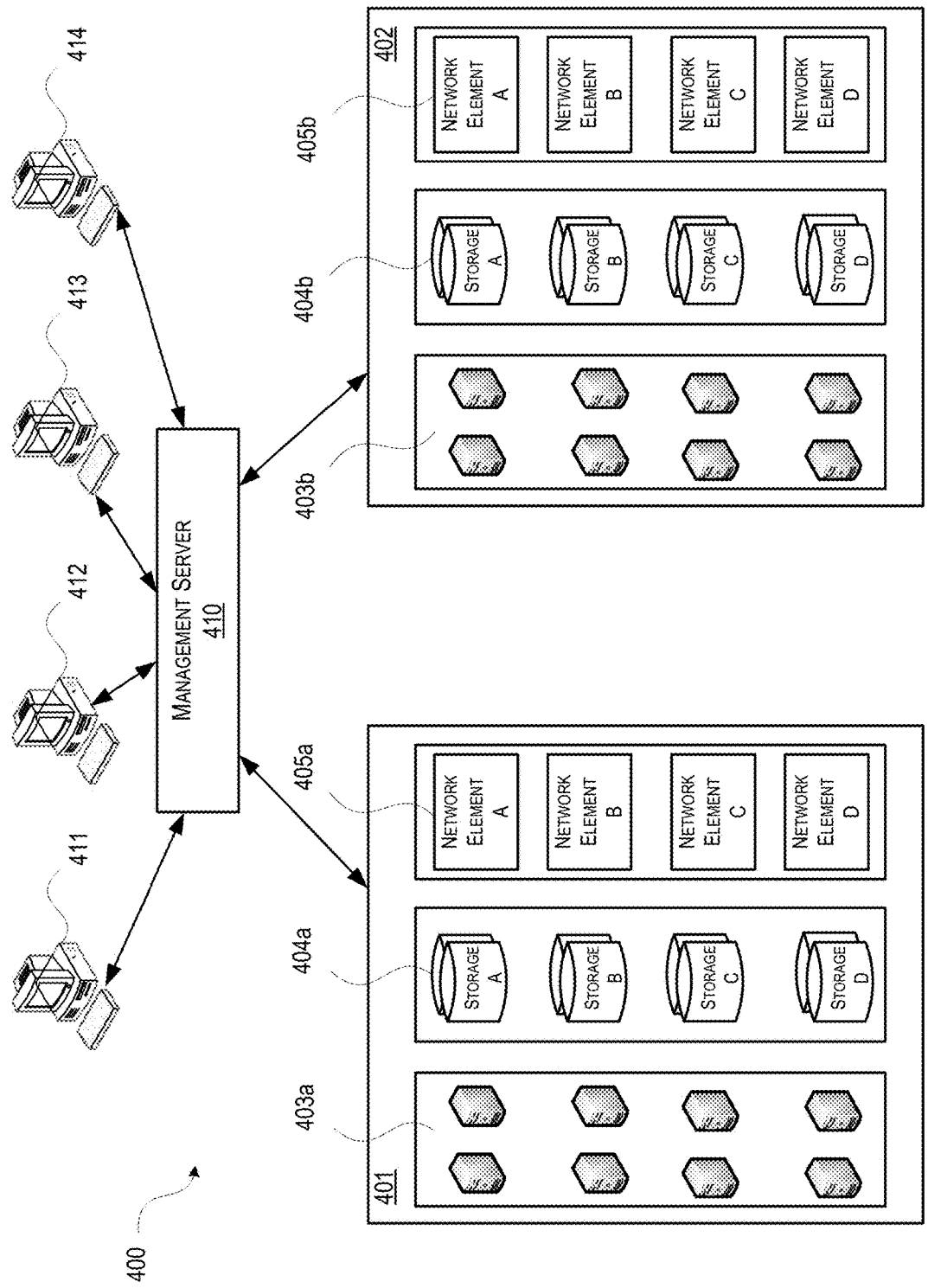
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Service Pool Architecture for Multitenant Services to Support Canary Release

As discussed above, aspects of the disclosure relate to using service pool architecture for multitenant services to support canary release. For example, a canary release may be a pattern for rolling out releases to a subset of enterprise users or servers in stages, where changes may be first deployed to a small subset of users or servers. If the test of the release is satisfactory, the changes may be rolled put to the rest of the users or server. In addition, one or more aspects of the disclosure may incorporate, be embodied in, and/or be implemented using one or more of the computer system architecture, remote-access system architecture, virtualized (hypervisor) system architecture, cloud-based system architecture, and/or enterprise mobility management systems discussed above in connection with FIGS. 1-4.

Figure 5:
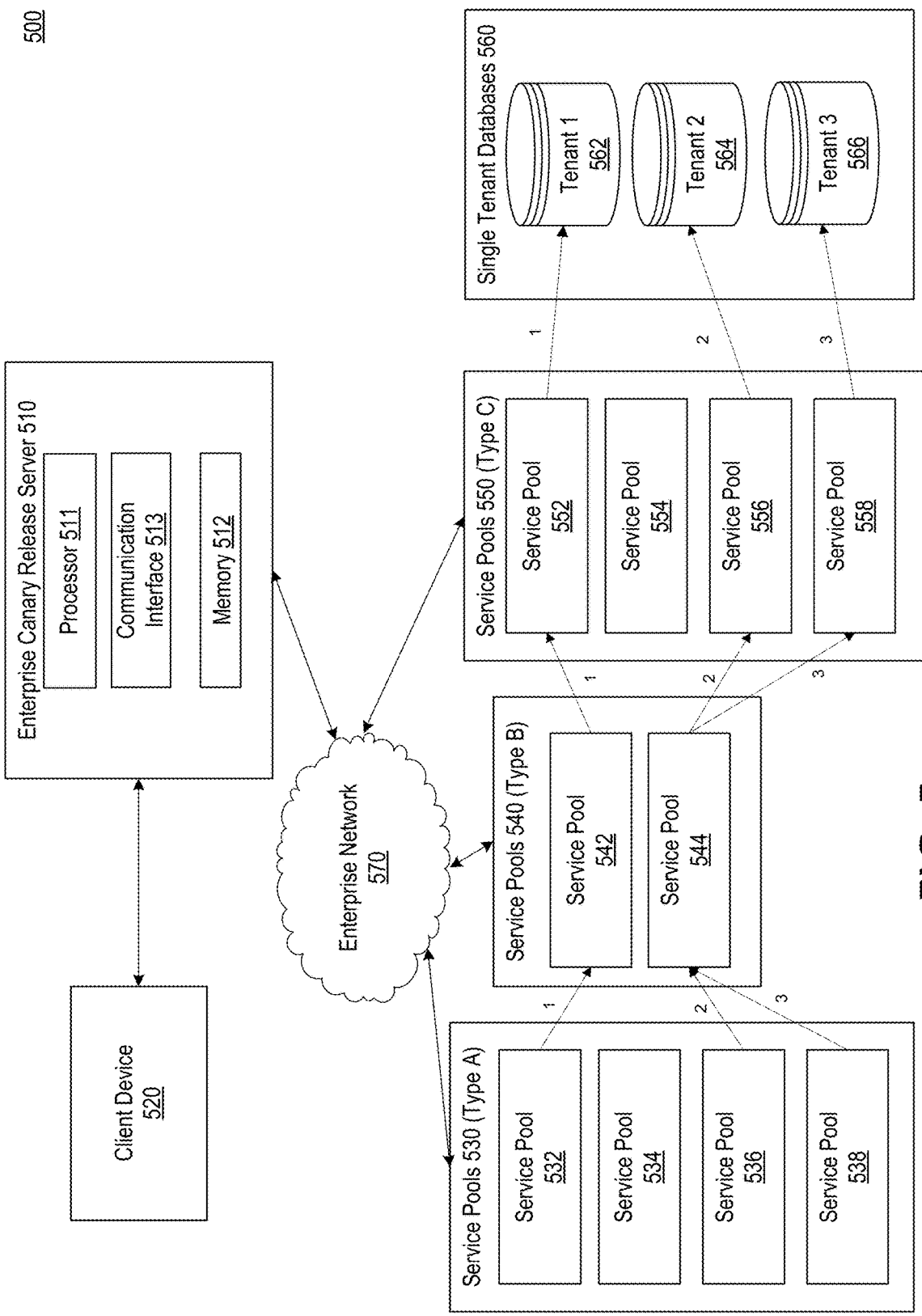
FIG. 5 depicts an illustrative computing environment for using service pool architecture for multitenant services to support canary release in accordance with one or more illustrative aspects described herein.

FIG. 5 depicts an illustrative computing environment for using service pool architecture for multitenant services to support canary release in accordance with one or more illustrative aspects described herein. Referring to FIG. 5, computing environment 500 may include an enterprise canary release server 510, client device 520, service pool A 530, service pool B 540, service pool C 550, single-tenant databases 560, and an enterprise network 570. Enterprise canary release server 510, client device 520, service pool A 530, service pool B 540, service pool C 550, and single-tenant databases 560 may include one or more physical components, such as one or more processors, memories, communication interfaces, and/or the like.

Enterprise canary release server 510 may include processor 511, memory 512, and communication interface 513. Processor 511 may execute instructions stored in memory 512 to cause enterprise server 510 to perform one or more functions, such as assigning service pools with a plurality of microservices for a virtual site associated with a tenant. Communication interface 513 may include one or more network interfaces via which enterprise canary release server 510 can communicate with one or more other systems and/or devices in computing environment 500, such as, client device 520, service pool A 530, service pool 540 and service pool 550, and single-tenant databases 560. Memory 512 may store configuration information assigning types A-C service pools 530-550 and the microservices for a virtual site.

Enterpriser canary release server 510 may be responsible for managing application deployments for multiple tenants in a canary fashion and may send and receive information to client device 520, service pools 530-550, single-tenant databases 560 and other computing devices of computing environment 500. A tenant may be a group of enterprise users who share a common access with specific privileges to a software instance. Client device 520 may have an administrator's console where enterprise administrators may send requests to enterprise canary release server 510 to manage software releases and roll backs via the administrator's console. Client device 520 may be any type of computing device including, for example, a server, computer, laptop, tablet, smartphone, or other client device that includes a processor (e.g., computing device 201). User device 520 may communicate, via their communication interfaces (e.g., wireless interfaces, LAN interfaces, WLAN interfaces), with other devices and/or entities such as enterpriser canary release server 510, as discussed in greater detail below. User device 510 may also communicate with various network nodes described herein.

Enterprise network 570 may include one or more wide area networks and/or local area networks and may interconnect one or more systems and/or devices included in computing environment 500. For example, enterprise network 570 may interconnect enterprise canary release server 510, client device 520, service pools 530-550 and single-tenant database 560.

System 500 may include one or more service pools 530-550. In the example of FIG. 5, service pools 530-550 may include three types of service pools: service pools 530 (type A), service pools 540 (type B) and service pools 550 (type C). A service pool may include a plurality of physical servers, each of the physical servers may include a processor, a memory, and a communication interface, similar to enterprise canary release server 510. Each of the physical servers in service pools 530-550 may implement one or more VM instances. In some examples, a VM instance may host one or more microservices for a virtual site. A service pool may be a collections of a specific type of microservices that share common functionalities. In the example illustrated in FIG. 5, service pools 530 (type A) include service pools 532, 534, 536 and 538, service pools 540 (type B) include service pools 542 and 544, and service pool 550 (type C) includes service pools 552, 554, 556 and 558. For example, service pools 530 (type A) may include a type of microservices with broker functionalities, service pools 540 (type B) may include a type of microservices with monitoring functionalizes, while service pools 550 (type C) may include a type of microservices with DDC functionalities. The service pools and the microservices in each service pool may be grouped together based on some criteria, which are further illustrated in FIGS. 6A and 6B. In some examples, the service pools of the same type, such as service pools 532 and 534, may be duplicates of each other in their internal structure. In some examples, the service pools of the same type may have different architectures, but share some commonalities in the virtual machine configuration and microservice configuration.

Figure 9:
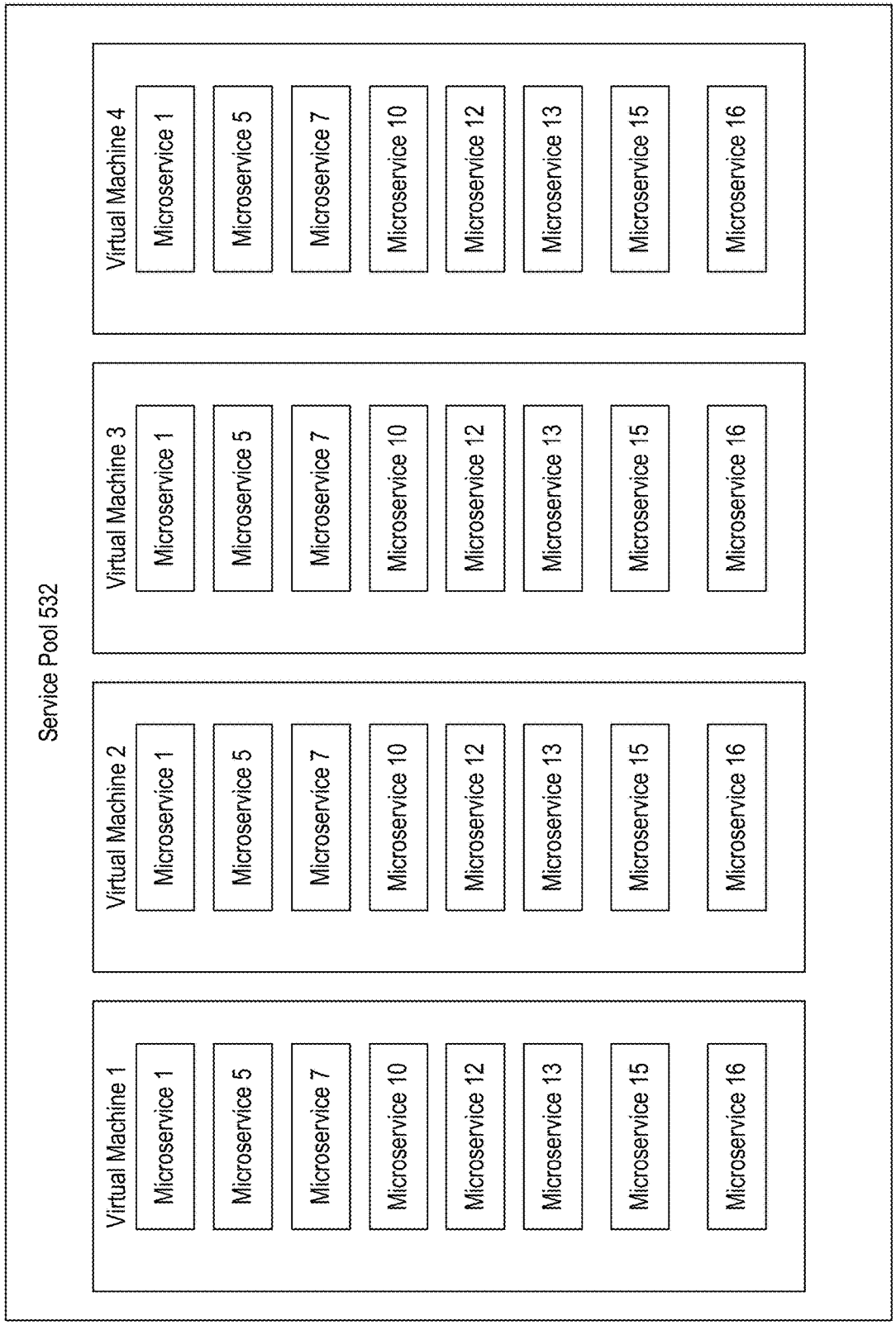
FIG. 9 depicts an illustrative internal architecture of a service pool in accordance with one or more illustrative aspects described herein.

FIG. 9 depicts an illustrative internal architecture of a service pool in accordance with one or more illustrative aspects described herein. For example, FIG. 9 may illustrate an internal architecture of service pool 532. Service pools 534, 536 and 538 (not shown in FIG. 9) of the same type (type A) may implement similar or identical architecture as service pool 532. As illustrated in FIG. 9, service pool 532 may include virtual machines 1-4, and each virtual machine may host a collection of microservices, such as microservices 1, 5, 7, 10, 12, 13, 15 and 16. In some examples, virtual machines 2-4 may duplicate the architecture of virtual machine 1, such that each virtual machine may provide high availability and failover functionalities for another virtual machine. For example, in the event that microservice 1 on virtual machine 1 becomes unavailable, microservice 1 on any other virtual machines (such as virtual machines 2-4) may assume the functionality of the failed microservice and service requests from client devices on its behalf.

Enterprise canary release server 510 may allocate service pool 532 to support multitenant services. For example, enterprise canary release server 510 may assign microservices 1, 5, 7, 10, 12, 13, 15 and 16 on virtual machine 1 to support tenant 1, microservices 1, 5, 7, 10, 12, 13, 15 and 16 on virtual machine 2 to support tenant 2, microservices 1, 5, 7, 10, 12, 13, 15 and 16 on virtual machine 3 to support tenant 3, and microservices 1, 5, 7, 10, 12, 13, 15 and 16 on virtual machine 4 to support tenant 4. The assignment of the microservices on each virtual machine may be configured dynamically for a tenant based on the variation of the loads in service pool 532. In some examples, enterprise canary release server 510 may assign microservices 1, 5, 7, 10, 12, 13, 15 and 16 on virtual machines 1 and 2 to support tenant 1 based on the variation of the loads in service pool 532. The assignment of the microservices on each virtual machine may be configured dynamically for each tenant. Referring back to FIG. 5, enterprise canary release server 510 may assign a collection of microservices from each service pool to service a virtual site. For example, enterprise canary release server 510 may assign one or more microservices in service pool 532 ("microservice 532") from type A service pools 530, one or more microservices in service pool 542 (microservice 542") from type B service pools 540, and one or more microservices in service pool 552 ("microservice 552) from type C service pools 540 to service virtual site 1. Enterprise canary release server 510 may assign one or more microservices in service pool 536 from type A service pools 530, one or more microservices from service pool 544 from type B service pool 540, and one or more microservices in service pool 556 from type C service pool to service virtual site 2. Enterprise canary release server 510 may assign one or more microservices in service pool 538 from type A service pools 530, one or more microservices in service pool 544 from type B service pools 540, and one or more microservices in service pool 558 from type C service pools 550 to service virtual site 3. In some examples, enterprise canary release server 510 may assign all the microservices on a virtual machine in a service pool to service a virtual site. In some examples, enterprise canary release server 510 may assign a portion of the microservices on the virtual machines in the service pool to service the virtual site.

System 500 may include one or more single-tenant databases 560. For example, a first single-tenant database is dedicated to virtual site 1, a second single-tenant database is dedicated to virtual site 2 and a third single-tenant database is dedicated to virtual site 3. In some examples, virtual sites 1-3 may correspond to three individual developers who may be actively testing several versions of the codes, and each developer may have a full deployment of a private virtual site across the service pools, which may allow them to share resources without dependencies. The service pools and virtual sites architecture may be a hybrid approach allowing the services to be split into a pseudo-multitenant deployment model and allowing for independent release cycles and development testing. This approach may offer more feasibility and flexibility than pure multitenancy, which may need a codebase rewrite from scratch.

Enterprise canary release server 510 may dynamically manage data plane connectivities among the microservices and the corresponding single-tenant database for a virtual site. In the example of virtual site 1, as an initial configuration, enterprise canary release server 510 may enable data plane connectivity between service pool 532 in type A service pools 530 and service pool 542 from type B service pools 540, enable data plane connectivity between service pool 542 from type B service pools 540 to service pool 552 from type C service pools 550, enable data plane connectivities from the service pools to single-tenant database 562 for virtual site 1. At the time to support a code release residing on a specific microservice for a virtual site, enterprise canary release server 510 may re-assign these data plane connectivities among the service pools and single-tenant databases. For example, a new build of code to be released on virtual site 1 may reside on microservice 534. During the migration, enterprise canary release server 510 may disconnect microservice 532 with microservice 542, and establish data plane connectivity between microservice 534 with microservice 542. As such, enterprise canary release server 510 maintains connectivities between microservice 542 from type C service pools 540, and single-tenant database 562 for virtual site 1, without causing any service disruptions to virtual site 2 and 3. Likewise, for a migration of new codes on virtual site 2, enterprise canary release server 510 may disconnect microservice 544 from microservice 556, and establish data plane connectivity between microservice 544 from service pools 540, and microservice 554 from service pools 550, where microservice 554 represents a new microservice with a new build of codes to be released to the enterprise users. After the migration, enterprise canary release server 510 establishes data plane connectivity among microservice 536 from type A service pool 530, microservice 544 from type B service pools 540, microservice 554 from type C service pools 550, and single-tenant database for virtual site 2. Accordingly, system 500 may support canary releases for multitenant services using an existing single-tenant database without re-writes.

In some examples, in transition into the service pool architecture for multitenant services, the approach may start with a single-tenant application hosted on a VM storing data in a centralized database such as single-tenant databases 562, 564 and 566. The application for a single virtual site may be split into a handful separately deployable, independent application groups—service pools, such as service pools 530-550, that all share the same single-tenant database.

In some examples, the service pools may reside behind a publically exposed Reverse Proxy server which may serve as a content switcher component in the enterprise canary release server. The content switcher may enable the service pools to be addressed with consistent URLs. Using multithreading, multi-processing, or simple code refactor, the approach may allow each of the independent service pools to support several virtual sites and maintain connections to each of the single-tenant databases for the virtual sites.

Figure 6A:
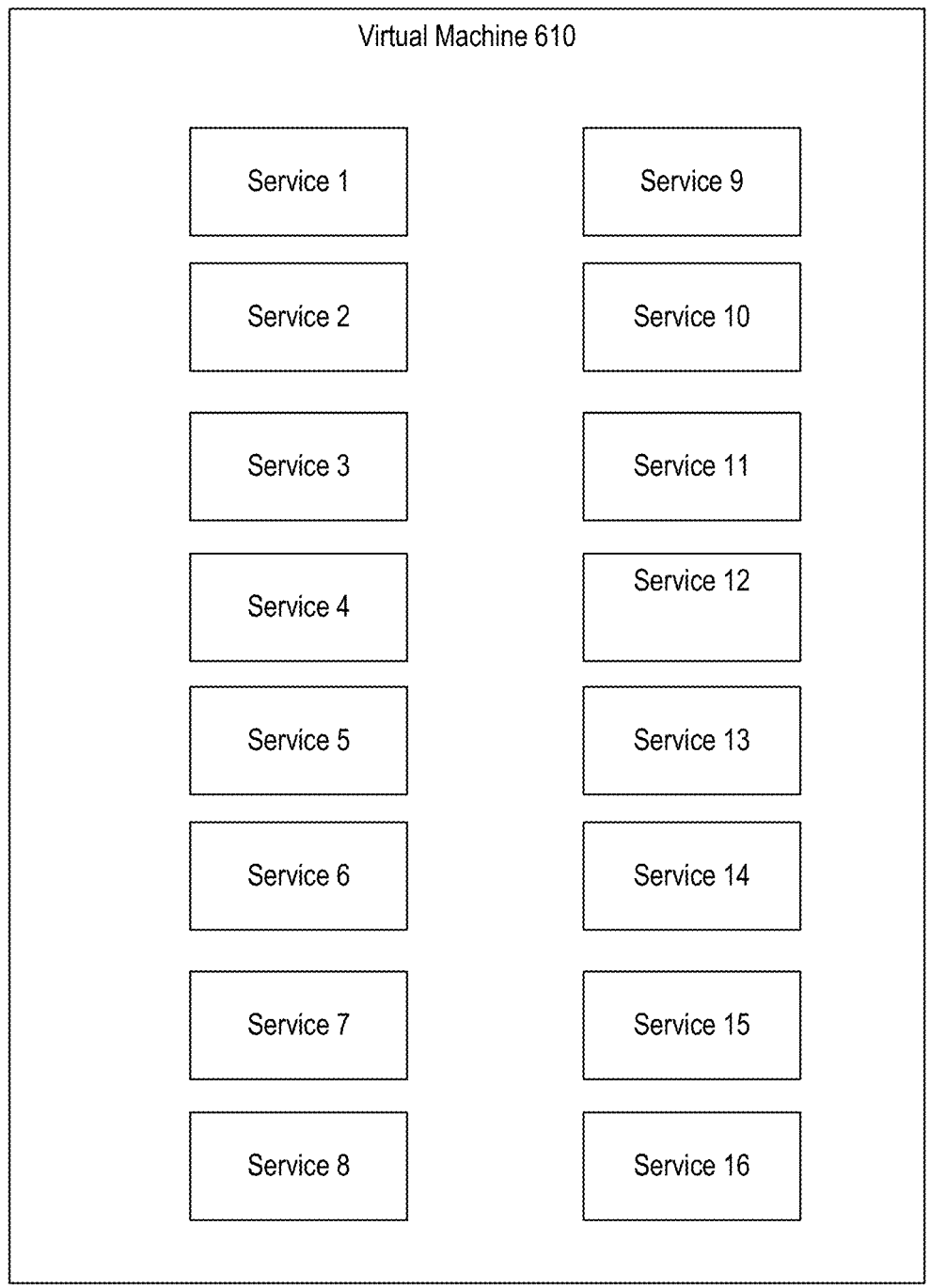
FIG. 6A depicts an illustrative computing environment for a single tenant architecture.

FIG. 6A depicts an illustrative computing environment for a single tenant architecture. In the conventional system as shown in FIG. 6A, there are sixteen services to be allocated to support a single tenant, and services 1-16 may constitute a cluster or a shard for a virtual site of the tenant. Note that all sixteen services reside in a single virtual machine, any code update to a single service, such as service 1, may need to bring down the entire cluster or shard on virtual machine 610, and accordingly the entire virtual site.

In this single-tenant architecture as illustrated in FIG. 6A, the customers of the virtual sites may generally be grouped corresponding to the shards or clusters of the virtual site. In some examples, the customers for an enterprise may be serviced by two clusters, cluster 1 and cluster 2, with each cluster containing an identical collection of services. Because clusters 1 and 2 are identical replica of each other, and the customers for the enterprise may be partitioned in these clusters. This single-tenant architecture may have an assumption that all services for the customers are scaled similarly, which may not be the case in reality.

For example, for customers to perceive the virtual site as a single function site, sixteen services, such as services 1-16, may need to service the virtual site. In FIG. 6A, a VM is allocated for the virtual site, with all sixteen services installed on one VM. Under this configuration, as customer base grows, the infrastructure cost may grow linearly. To deploy a new build, even to upgrade only one microservice, the VM hosting all these sixteen services have to be updated, which may render the deployment process cumbersome. For example, as one of the sixteen services may be CPU intensive, another service may be memory intensive, the way of specialization may be limited in this integrated approach on the single VM.

In some examples, a single-tenant enterprise application hosted in the single-tenant architecture may be deployed and managed in the cloud, which may provide the advantage of more frequent release cycles compared to on premise. However, the more frequent release cycles may be difficult to implement with the single-tenant architecture due to the fact that coding bugs in a particular microservice may hold back the entire release. This bottleneck with the integrated release cycle may be addressed in FIG. 6B.

Figure 6B:
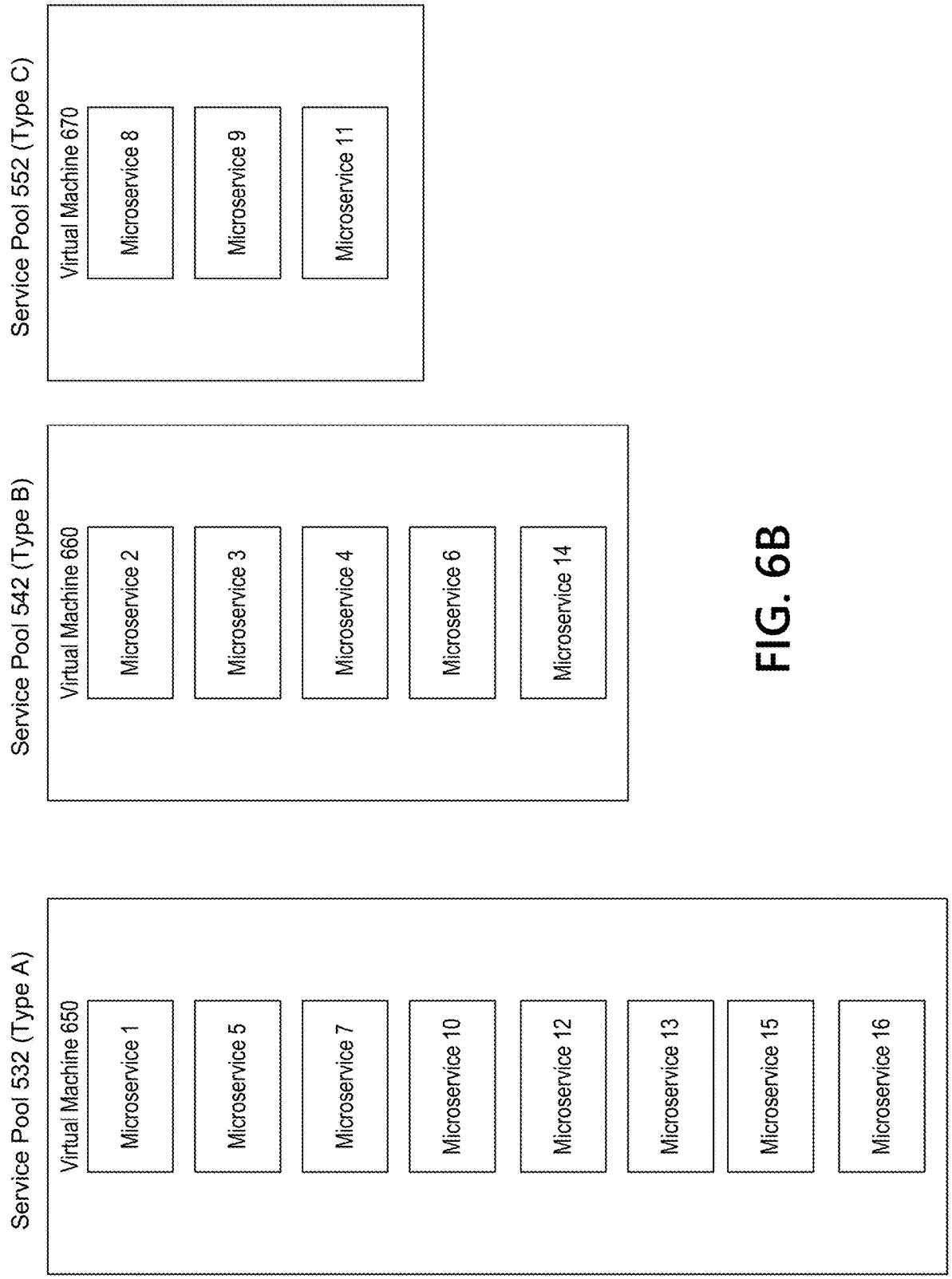
FIG. 6B depicts an illustrative service pool architecture for multitenant services to support canary release in accordance with one or more illustrative aspects described herein.

FIG. 6B depicts an illustrative service pool architecture for multitenant services to support canary release in accordance with one or more illustrative aspects described herein. Similar to FIG. 6A, a virtual site may be serviced by sixteen services. Based on some common functionalities, the services that support a virtual site, such as microservices 1-16, may be grouped into three types of service pools: type A service pool 532 may include microservices 1, 5, 7, 10, 12, 13, 15 and 16, type B service pool 542 may include microservices 2, 3, 4, 6, 14 and type C service pool 552 may include microservices 8, 9 and 11. In some examples, microservices 1-16 that service the virtual site may be grouped based on criteria such as machine requirements, so that type A service pool 532 may include CPU bound microservices, type B service pool 542 may include memory bound microservices and group C service pool 552 may include network bound microservices. In some examples, microservices 1-16 that service the virtual site may be grouped based on criteria such as service design requirements, so that type A service pool 532 may include a group of microservices that communicate with each other at high frequency, type B service pool 542 may include another group of microservices that communicate with each at high frequency, and group C service pool 552 may include a third group of microservices that communicate with other at high frequency. It is also possible to group the microservices into service pools based on other criteria.

The microservices in a service pool may reside on a virtual machine to share resources. For example, microservices 1, 5, 7, 10, 12, 13, 15 and 16 may be allocated on virtual machine 650 that implements type A service pools 530. Microservices 2, 3, 4, 6, 14 may be allocated on virtual machine 660 that implements type B service pools 540. Microservices 8, 9 and 11 may be allocated on virtual machine 670 that implements type C service pools 550. For a given virtual site that includes microservices 1-16, enterprise canary release server 510 may assign the microservices from each type of the service pools 530-550 to service the virtual site. Although FIG. 6B shows, for simplicity, that service pool 632 contains one virtual machine 650, service pool 632 may contain, for example, four virtual machines (as shown in FIG. 9), with microservices 1, 5, 7, 10, 12, 13, 15 and 16 allocated on each of the four virtual machines. Likewise, service pool 642 may contain, for example, three virtual machines, with microservices 2, 3, 4, 6, 14 allocated on each of the three virtual machines; and service pool 652 may contain four virtual machines, with microservices 8, 9 and 11 allocated on each of the four virtual machines.

The service pool architecture in FIG. 6B may be duplicated to service multiple virtual sites in a multitenant architecture as previously noted in FIGS. 5, and 9. For example, within type A service pools 530, service pools 534, 536 and 538 may have similar internal architecture as service pool 532. Within type B service pools 540, service pool 544 may have similar internal architecture as service pool 542. Within type C service pools 550, service pools 554, 556 and 558 may have similar internal architecture as service pool 552.

FIGS. 7A-7D depict an example event sequence for using service pool architecture for multitenant services to support canary release in accordance with one or more illustrative aspects described herein. The communications between components of FIGS. 7A-7D may be encrypted via Transport Layer Security (TLS) cryptographic protocols or Internet Protocol Security (IPsec) tunnels that provide communications security over a computer network.

Figure 7A:
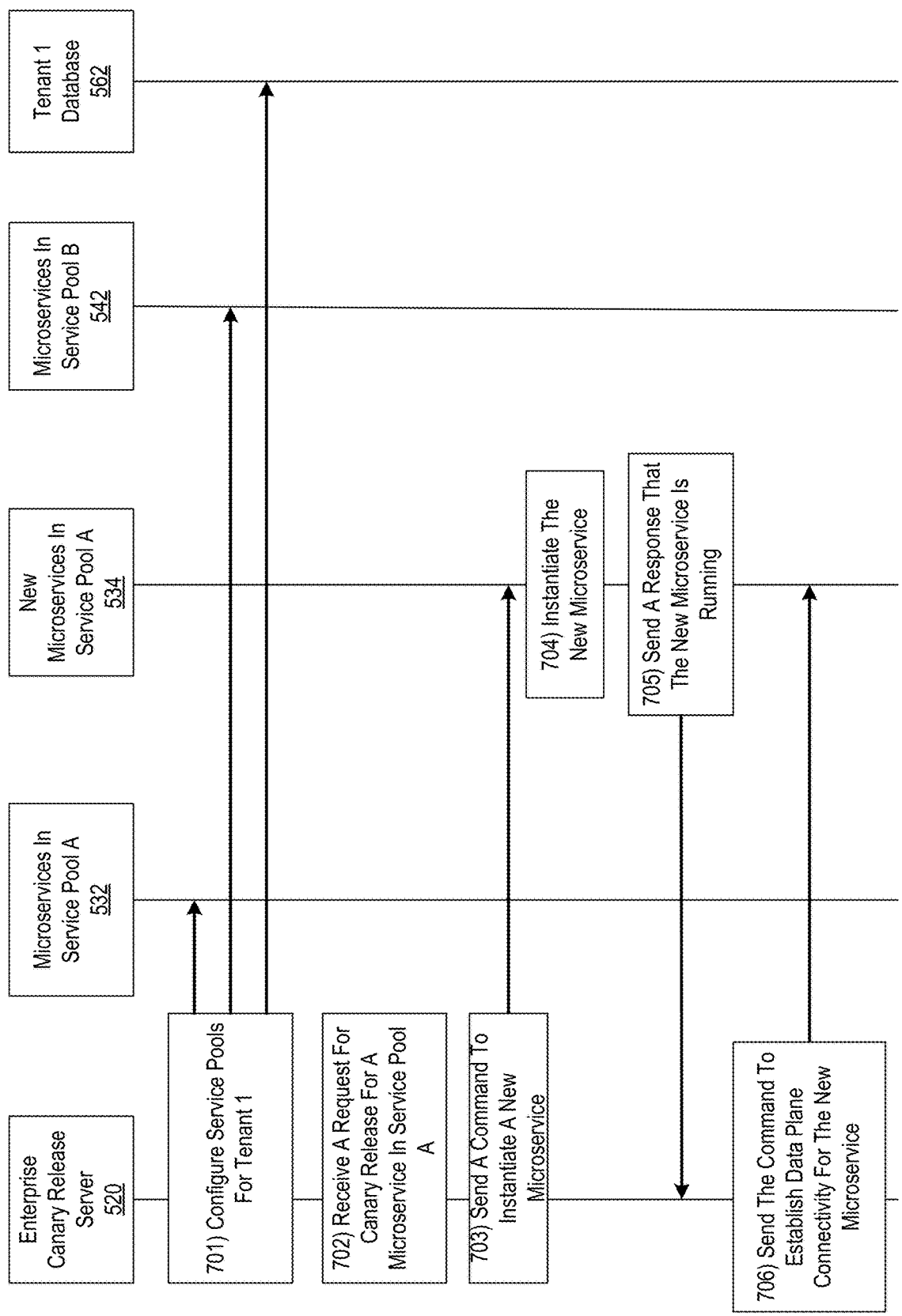
FIGS. 7A-7D depict an example event sequence for using service pool architecture for multitenant services to support canary release in accordance with one or more illustrative aspects described herein.

Referring to FIG. 7A, at step 701, enterprise canary release server configures service pools for a virtual site associated with a tenant. For example, enterprise canary release server 510 may configure service pools A-C 530-550 for a virtual site for tenant 1. In some examples, enterprise canary release server 510 may assign microservices in service pools 532, 542 and 552 from each type of service pools A-C 530-550 respectively to service the virtual site of tenant 1. Enterprise canary release server 510 may also configure data plane connectivity between the service pools with single-tenant database for tenant 1 560. As noted in FIG. 5, a service pool may be a collection of microservices, such as broker service, monitor service, identity service, machine creation service, host service, configuration service, logging service, environment testing service etc. A service pool may include a plurality of microservices that constitute a type of these services based on criteria as discussed in FIG. 6B.

Enterprise canary release server 510 may include a content switcher component to manage the configuration and assignment of the service pools, and the microservices in each service pool to the corresponding tenants. Enterprise canary release server 510 may include a NetScaler content switcher to present different content to different tenants and virtual sites. For example, enterprise canary release server 510 may direct enterprise users associated with tenant 1 to microservice 532 in service pool A 530 based on specific service pools and microservices serving the virtual site.

In some examples, enterprise canary release server 510 may assign microservices dynamically based on the detected load on the virtual site and the available microservices in a service pool. For example, when the load on a virtual site for tenant 1 is relatively low, enterprise canary release server 510 may assign microservice 532 from service pool A 530 to service tenant 1. In some examples, when the load on a virtual site for tenant 1 is relatively high, enterprise canary release server 510 may assign microservices 532 and 534 from type A service pools 530 to service tenant 1. The information related to the configuration and assignment of the microservices and service pools for the tenants may be stored in a data store in enterprise canary release server 510.

At step 702, enterprise canary release server may receive a request for canary release for a microservice in a service pool. For example, enterprise canary release server 510 may receive a request from an enterprise user from client device 520 via an administration console for a canary release of a software upgrade for a broker service on microservice 532 in service pool A 530.

At step 703, enterprise canary release server may send a command to instantiate a new microservice. In some examples, enterprise canary release server may identify that a new microservice in service pool A 530, such as microservice 534, may have a new build of codes for the broker service to be upgraded. For example, enterprise canary release server 510 may send a command to instantiate a new microservice 534.

At step 704, the new microservice may be spun up and at step 705, the new microservice may send a response to the enterprise canary release server that the new microservice is up and running. For example, new service 534 may instantiate and send a message to enterprise canary release server 510 to report its status.

At step 706, enterprise canary release server may send the command to establish data plane connectivity for the new microservice. For example, enterprise canary release server 510 may issue a command to new microservice 534 in type A service pools 530 for its data plane connectivity to the corresponding microservice in type B service pools 540, such as microservice 542. Given that microservice 542 may not need upgrade at this time, new microservice 534 may connect to microservice 542, which may maintain the connectivity between the type A and type B server pools to single-tenant database 562.

In some examples, if an administrator is tasked to deploy a new build of microservice in type A service pools, such as a broker pool, the new service pool in type A server pools may connect to the existing microservices in type B and type C service pools, and the single-tenant database. For an upgrade to a microservice in type A service pools, there may not be need to redeploy the microservices in type B and type C service pools, nor to re-deploy the entire architecture. The approach may upgrade one virtual site at a time and one service pool at a time, which may provide more granular and better-controller upgrade process.

Figure 7B:
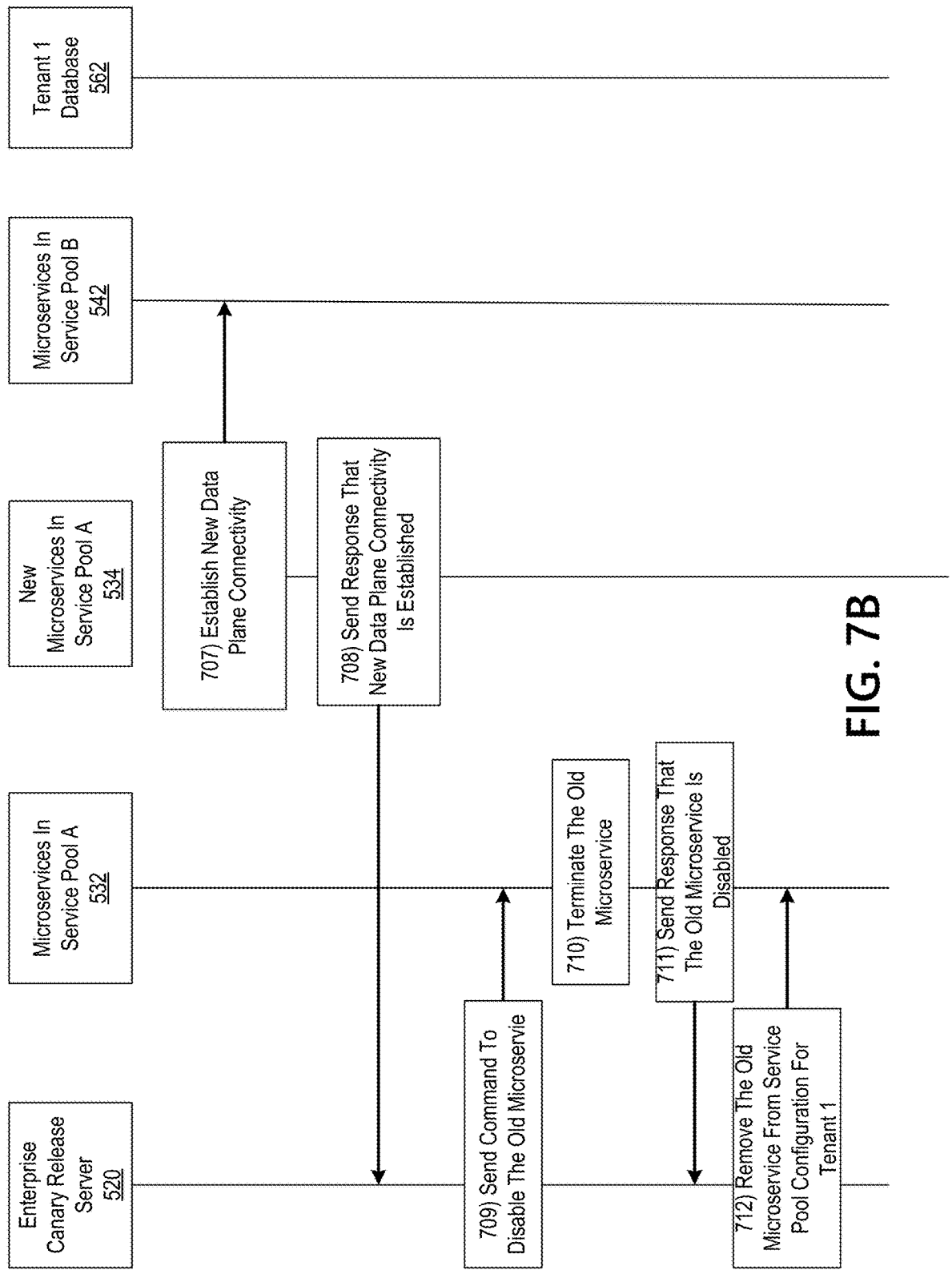

Turning to FIG. 7B, at step 707, the new microservice may establish new data plane connectivity and at step 708, may report the status of connectivity update to the enterprise canary release server. For example, new microservice 534 may establish new data plane connectivity to microservice 542 from type B service pools 540, which in turn may connect to microservice 552 from type C service pools 550 and single-tenant database for tenant 1 562. Upon completion of the new connectivity, new microservice 534 may send a message to enterprise canary release server 510 to indicate the status of the connectivity.

In some examples, each microservice in the service pool, such as microservices 532 and 534 in type A service pools 530, may not be the same version. The customers for a virtual site may be moved around from one microservice in the service pool to another to achieve zero down time. The content switcher component of the enterprise canary release server may implement the live upgrade from one microservice to another in the service pools, where the content switcher may server as a reverse proxy to the environment, maintain where the customers for a virtual site may be routed to. In some examples, the instances to be switched may be are stateless, which may allow switching from one microservice to another. In some examples, the configuration information referenced by the content switcher may be updated to facilitate the switch to another microservice. In some examples, the microservices in each service pool may be managed dynamically. When one microservice in the service pool is overloaded, the approach may implement a switch to another microservice with more capacity in the same pool, without affecting the other service pools.

At step 709, enterprise canary release server may send a command to disable the old microservice. For example, enterprise canary release server 510 may send a command to microservice 532 to disable this instance of the microservice. At step 710, the old microservice may be terminated and at step 711, a message may be sent to the enterprise canary release server that the old microservice is no longer running. For example, microservice 532 may be terminated and a message may be sent to enterprise canary release server 510 to update the status that microservice 532 is disabled.

At step 712, in response to receiving a message on the disabled state of the old microservice, enterprise canary release server may remove the old microservice from the configuration information on a list of microservices assigned to tenant 1. For example, enterprise canary release server 510 may remove the old microservice 532 from a list of microservices assigned to tenant 1 and update the list to include the new microservice 534 from type A service pools 530 for tenant 1.

Figure 7C:
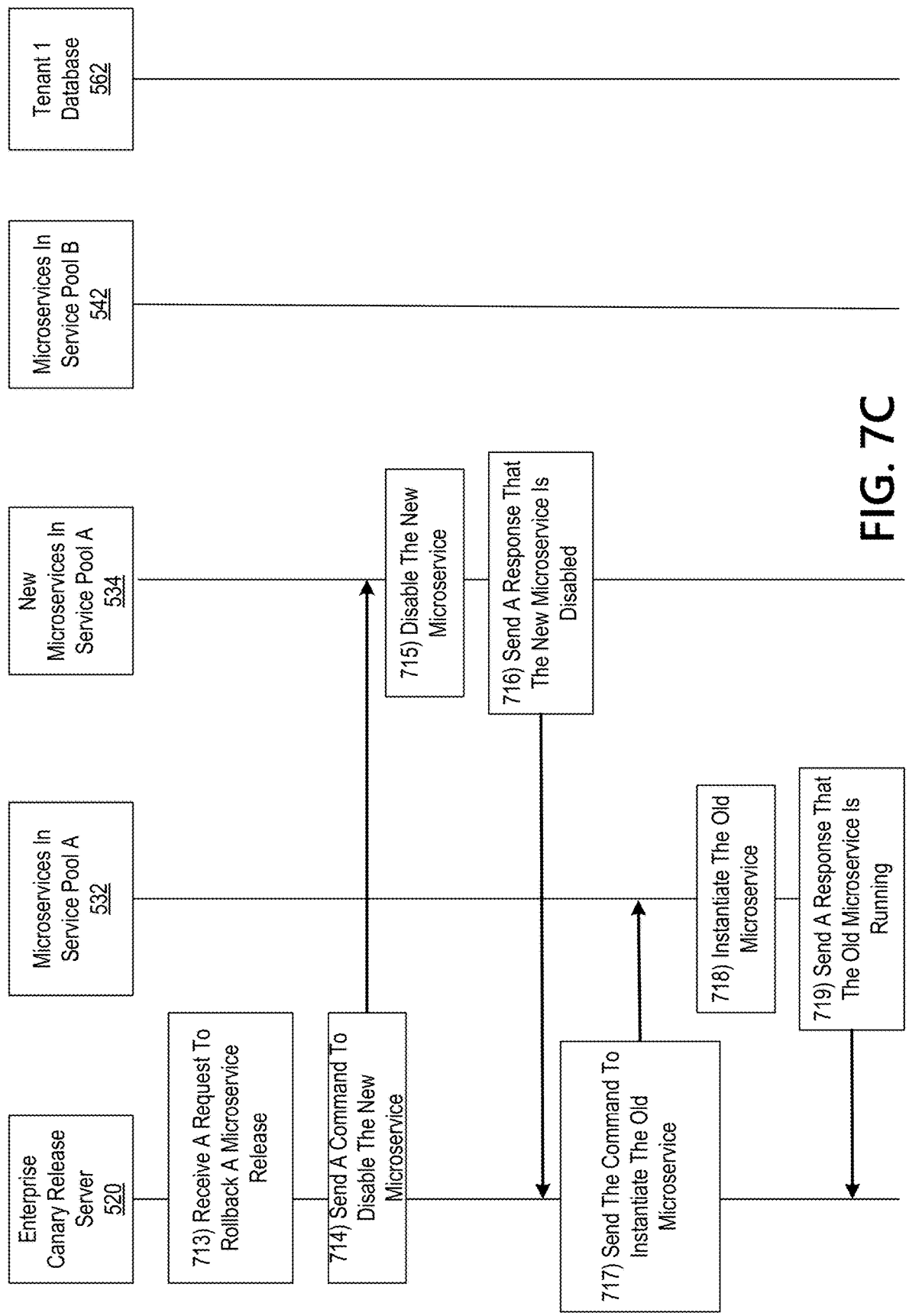

At step 713 in FIG. 7C, the enterprise canary release server may receive a request to roll back a release. In some examples, in the event that the newly deployed build of codes microservice is buggy or otherwise unsatisfactory, an enterprise administrator may wish to roll back the codes to a previous build. For example, client device 520 may send a request to enterprise canary release server 510 to roll back a release. Enterprise canary release server 510 may identify that the release is associated a new build that is recently deployed on new microservice 534 and a previous build was deployed on old microservice 532.

At step 714, the enterprise canary release server may send the command to instantiate the old microservice. For example, enterprise canary release server 510 may send the command to instantiate the old microservice 532 from type A service pools 530.

At step 715, the old microservice may be enabled and at step 716, the old microservice may send a message to the enterprise canary release server to indicate that the old microservice is up and running. For example, microservice 532 from type A service pools 530 with the previous build of codes may be enabled and microservice 532 may send a message to enterprise canary release server 510 to indicate that microservice 532 is up and running.

At step 717, the enterprise canary release server may send a command to establish data plane connectivity for the old microservice. For example, enterprise canary release server 510 may send a command to establish data plane connectivity for the old microservice 532 from type A service pools 530 to establish a data plane connectivity with microservice 542 from type B service pools 540.

Figure 7D:
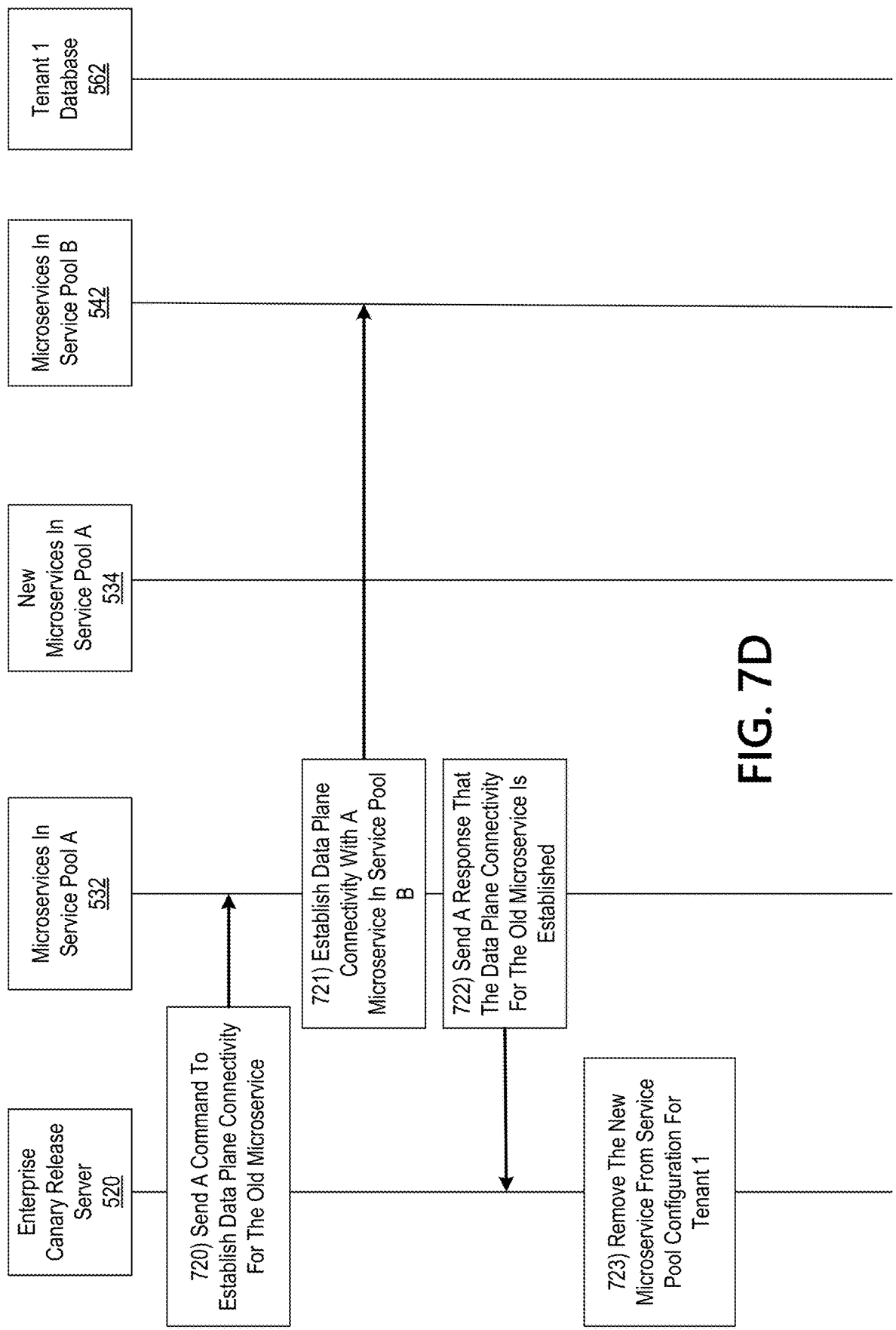

At step 718, the old microservice may establish data plane connectivity with a microservice in service pool B and at step 719 in FIG. 7D, the old microservice may send a response that the data plane connectivity for the old microservice is established. For example, old microservice 532 from type A service pools 530 may establish a data plane connectivity with microservice 542 from type B service pools 540 and microservice 532 may send a message to enterprise canary release server 510 to indicate that microservice 532 has established data plane connectivity with microservice 542 from type B service pools 540.

At step 720, the enterprise canary release server may send the command to disable the new microservice. For example, enterprise canary release server 510 may send the command to disable the new microservice 534 from type A service pools 530.

At step 721, the new microservice may be disabled and at step 722, the new microservice may send a message to the enterprise canary release server to indicate that the new microservice is disabled. For example, microservice 534 from service pool 530 A with the recently deployed new build may be disabled and microservice 534 may send a message to enterprise canary release server 510 to indicate that microservice 534 is disabled.

At step 723, the enterprise canary release server may remove the new microservice from the service pool configuration for tenant 1. For example, enterprise canary release server 510 may remove the new microservice 534 from the configuration information on a list of microservices serving a virtual site of tenant 1.

In some examples, the method illustrated in FIGS. 7A-7D may provide a mechanism to seamlessly move a virtual site from one particular microservice in a service pool cluster to a new microservice in the service pool cluster. The approach may be used to deploy newer versions of codes, or handle capacity changes to dynamically select an appropriate number of microservices in each service pool cluster to accommodate an expansion of user community.

In some examples, to deploy new versions of codes with schema changes, the schema changes may first be applied to the previous microservice in the service pool, allowing schema changes and service pool migration to be decoupled. For example, to implement a schema upgrade, the changes to the schema may run against the tables used by the applications for a particular service pool. As such, in the event of a failure in some examples, the schema may be reverted to its previous version for the particular service pool. In some examples, to support a service pool migration, the process may be implemented as described in FIGS. 7A and 7B. In the event of a migration failure, the a previous state may be restored by switching the virtual site back to the previous microservice in the service pool, as described in FIGS. 7C and 7D.

In some examples, the service pool architecture may be used as a process for single-tenant cloud service to transition into a multi-tenant architecture, while maintaining the single-tenant databases. This approach may become increasingly more common as other enterprise software and their customers are starting to embrace the cloud. In some examples, aside from easing a transition from a single-tenant architecture into a multi-tenant architecture, this approach may also be used as a permanent design pattern, especially when dealing with large and distributed development teams. For example, a virtual site may be established for an individual developer, where each developer may deploys the entire service across the service pools. With the service pool architecture, the customers may be located arbitrarily on the service pools, the developers may share some service pools, or alternatively may have private service pools and microservices. In some examples, each microservice in the service pool may be deployed and scaled independently, which may allow for increased developer, operational and release productivity and cost savings.

Figure 8:
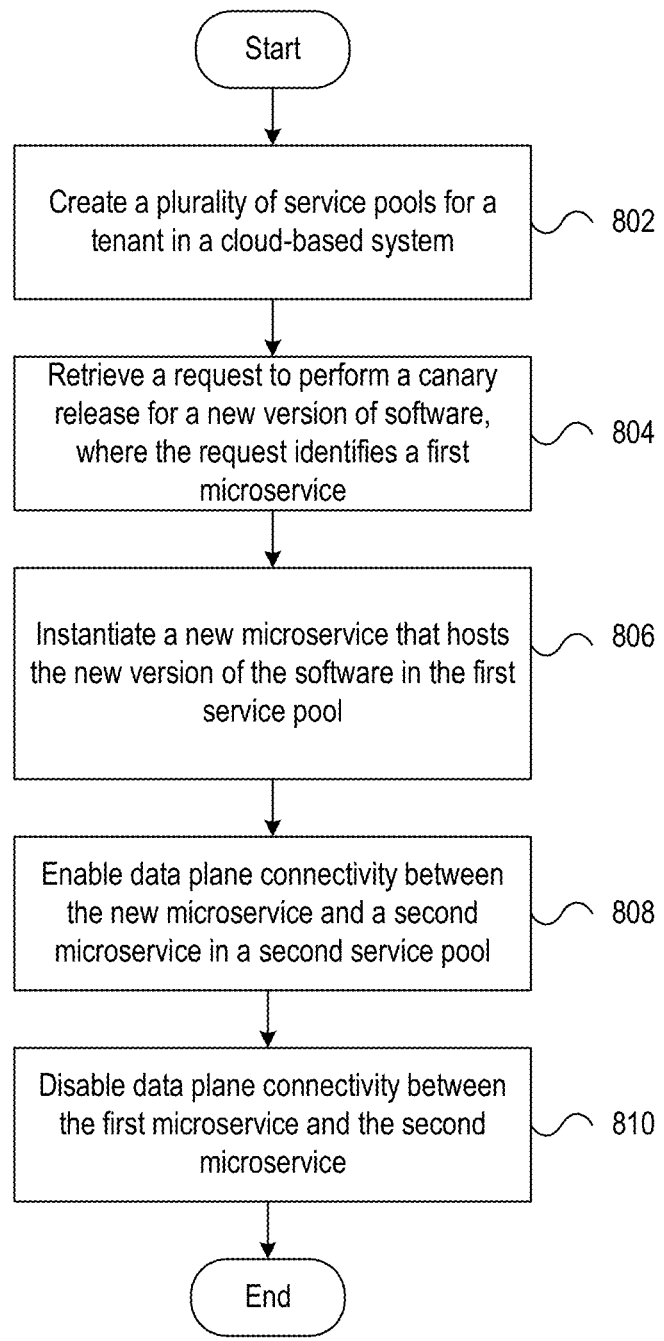
FIG. 8 depicts an example method of using service pool architecture for multitenant services to support canary release in accordance with one or more illustrative aspects described herein.

FIG. 8 depicts an example method of using service pool architecture for multitenant services to support canary release in accordance with one or more illustrative aspects described herein. Referring to FIG. 8, at step 802, an enterprise canary release server (e.g. enterprise canary release server 510) having at least one processor, a communication interface, and memory, may create a plurality of service pools for a tenant in a cloud-based system that supports a plurality of tenants, wherein each service pool may comprise a plurality of microservices. At step 804, the enterprise canary release server may receive, via the communication interface, a request to perform a canary release for a new version of software, where the request identifies a first microservice out of the plurality of microservices in a first service pool, and the first microservice is configured to communicate with a second microservice in a second service pool. At step 806, the enterprise canary release server may instantiate a new microservice that hosts the new version of the software in the first service pool. At step 808, the enterprise canary release server may enable data plane connectivity between the new microservice and the second microservice. Accordingly, at step 810, the enterprise canary release server may disable data plane connectivity between the first microservice and the second microservice.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. An enterprise canary release server comprising:
   at least one processor;
   a communication interface;
   memory storing instructions that, when executed by the at least one processor, cause the enterprise canary release server to:
   create a plurality of types of service pools in a cloud-based system that supports a plurality of tenants, wherein each service pool comprises a plurality of microservices that share a common functionality, wherein a virtual site is provisioned with a service pool from each type of service pools, and wherein the microservices assigned for the virtual site are associated with a single-tenant database;
   receive, via the communication interface, a request to perform a canary release for a new version of software, and identify a first microservice out of the plurality of microservices in a first service pool of a first type of service pools, wherein the first microservice is configured to communicate with a second microservice in a second service pool of a second type of service pools;

dynamically assign a first number of microservices from the plurality of microservices in the first service pool and a second number of microservices from the plurality of microservices in the second service pool to service the virtual site based on a variation of loads in the first service pool and the second service pool;

instantiate a new microservice that hosts the new version of the software in the first service pool;

enable data plane connectivity between the new microservice and the second microservice; and disable data plane connectivity between the first microservice and the second microservice.

2. The enterprise canary release server of claim 1, wherein the memory stores additional instructions that, when executed by the at least one processor, cause the enterprise canary release server to:

prior to receiving the request for the canary release, provision each service pool to service the plurality of tenants.

3. The enterprise canary release server of claim 1, wherein the memory stores additional instructions that, when executed by the at least one processor, cause the enterprise canary release server to:

in response to disabling data plane connectivity between the first microservice and the second microservice, decommission the first microservice.

4. The enterprise canary release server of claim 3, wherein the memory stores additional instructions that, when executed by the at least one processor, cause the enterprise canary release server to:

reconfigure the first microservice to service a second virtual site.

5. The enterprise canary release server of claim 1, wherein the memory stores additional instructions that, when executed by the at least one processor, cause the enterprise canary release server to:

receive, via the communication interface, a request to roll back the new version of software;

disable the data plane connectivity between the new microservice and the second microservice; and enable the data plane connectivity between the first microservice and the second microservice.

6. The enterprise canary release server of claim 4, wherein the memory stores additional instructions that, when executed by the at least one processor, cause the enterprise canary release server to:

decommission the new microservice that hosts the new version of the software in the first service pool.

7. The enterprise canary release server of claim 1, wherein each service pool is associated with a plurality of single-tenant databases.

8. A method comprising:

at an enterprise canary release server comprising at least one processor, memory, and a communication interface:

creating a plurality of types of service pools in a cloud-based system that supports a plurality of tenants, wherein each service pool comprises a plurality of microservices that share a common functionality, wherein a virtual site is provisioned with a service pool from each type of service pools, and wherein the microservices assigned for the virtual site are associated with a single-tenant database;

receiving, via the communication interface, a request to perform a canary release for a new version of software, wherein the request identifies a first microservice out of the plurality of microservices in a first service pool of a first type of service pools, wherein the first microservice is configured to communicate with a second microservice in a second service pool of a second type of service pools;

dynamically assigning a first number of microservices from the plurality of microservices in the first service pool and a second number of microservices from the plurality of microservices in the second service pool to service the virtual site based on a variation of loads in the first service pool and the second service pool;

instantiating a new microservice that hosts the new version of the software in the first service pool;

enabling data plane connectivity between the new microservice and the second microservice; and disabling data plane connectivity between the first microservice and the second microservice.

9. The method of claim 8, further comprising:

prior to receiving the request for the canary release, provisioning each service pool to service the plurality of tenants.

10. The method of claim 8, further comprising:

in response to disabling data plane connectivity between the first microservice and the second microservice, decommissioning the first microservice.

11. The method of claim 8, further comprising:

reconfiguring the first microservice to service a second virtual site.

12. The method of claim 8, further comprising:

receiving, via the communication interface, a request to rollback the new version of software;

disabling the data plane connectivity between the new microservice and the second microservice; and enabling the data plane connectivity between the first microservice and the second microservice.

13. The method of claim 8, wherein each service pool is associated with a plurality of single-tenant databases.

14. One or more non-transitory computer-readable media storing instructions that, when executed by a computing platform comprising at least one processor, memory, and a communication interface, cause the computing platform to:

create a plurality of types of service pools in a cloud-based system that supports a plurality of tenants, wherein each service pool comprises a plurality of microservices that share a common functionality, wherein a virtual site is provisioned with a service pool from each type of service pools, and wherein the microservices assigned for the virtual site are associated with a single-tenant database;

receive, via the communication interface, a request to perform a canary release for a new version of software, wherein the request identifies a first microservice out of the plurality of microservices in a first service pool of a first type of service pools, wherein the first microservice is configured to communicate with a second microservice in a second service pool of a second type of service pools;

dynamically assign a first number of microservices from the plurality of microservices in the first service pool and a second number of microservices from the plurality of microservices in the second service pool to service the virtual site based on a variation of loads in the first service pool and the second service pool;

instantiate a new microservice that hosts the new version of the software in the first service pool;
enable data plane connectivity between the new microservice and the second microservice; and
disable data plane connectivity between the first microservice and the second microservice.

* * * * *